Sept. 11, 1962    B. E. HOUSE ETAL    3,053,347
BRAKE SHOE FOR EXPANDING SHOE BRAKE
Original Filed Sept. 2, 1954    5 Sheets-Sheet 1
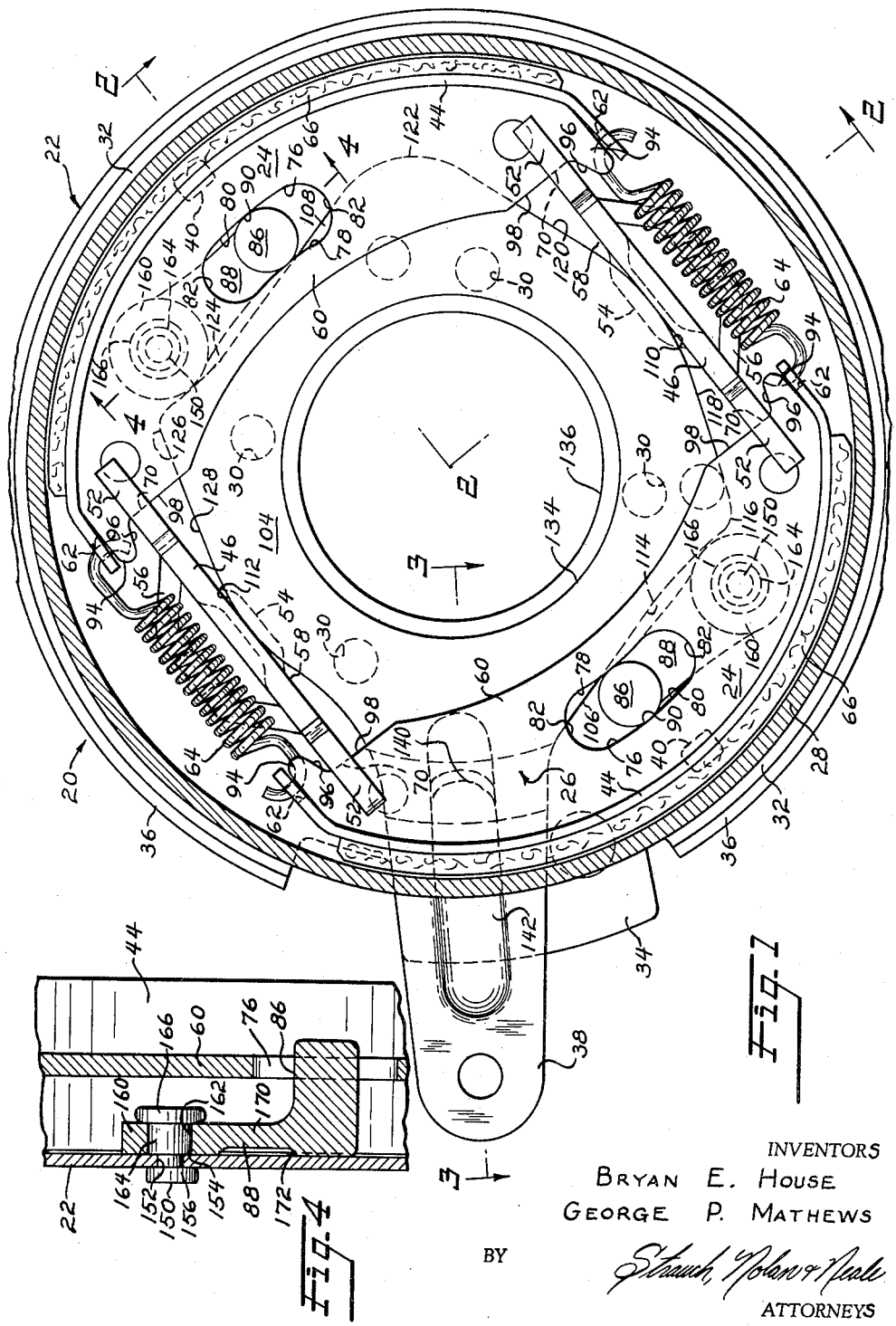
INVENTORS
BRYAN E. HOUSE
GEORGE P. MATHEWS
BY
Strauch, Nolan & Neale
ATTORNEYS

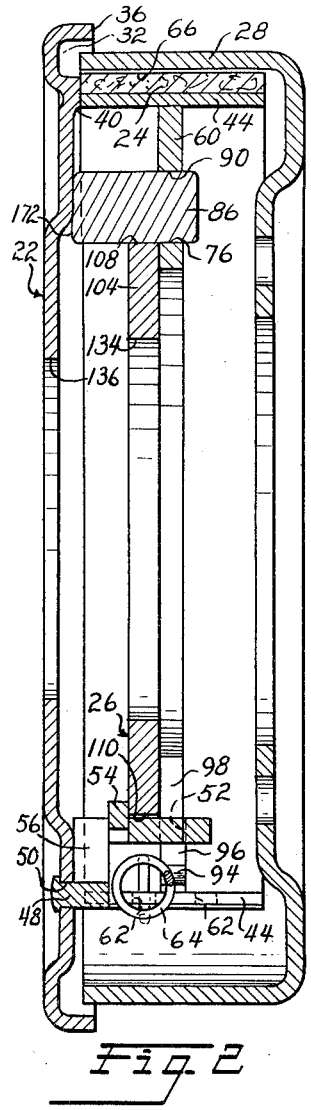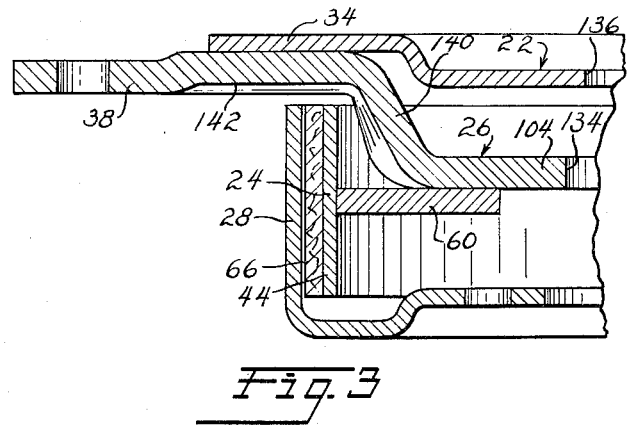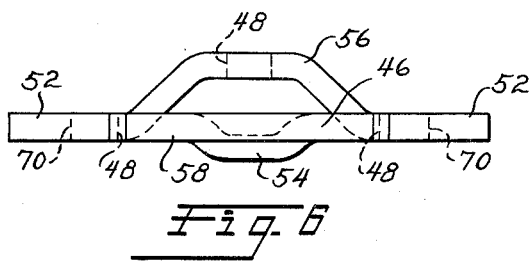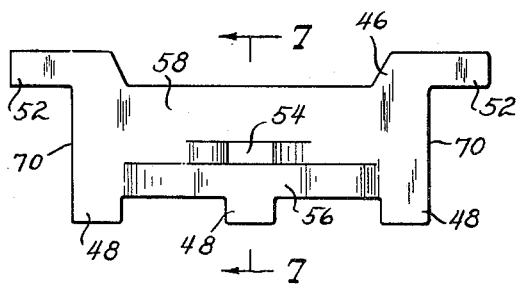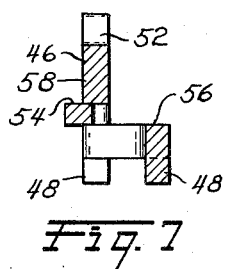

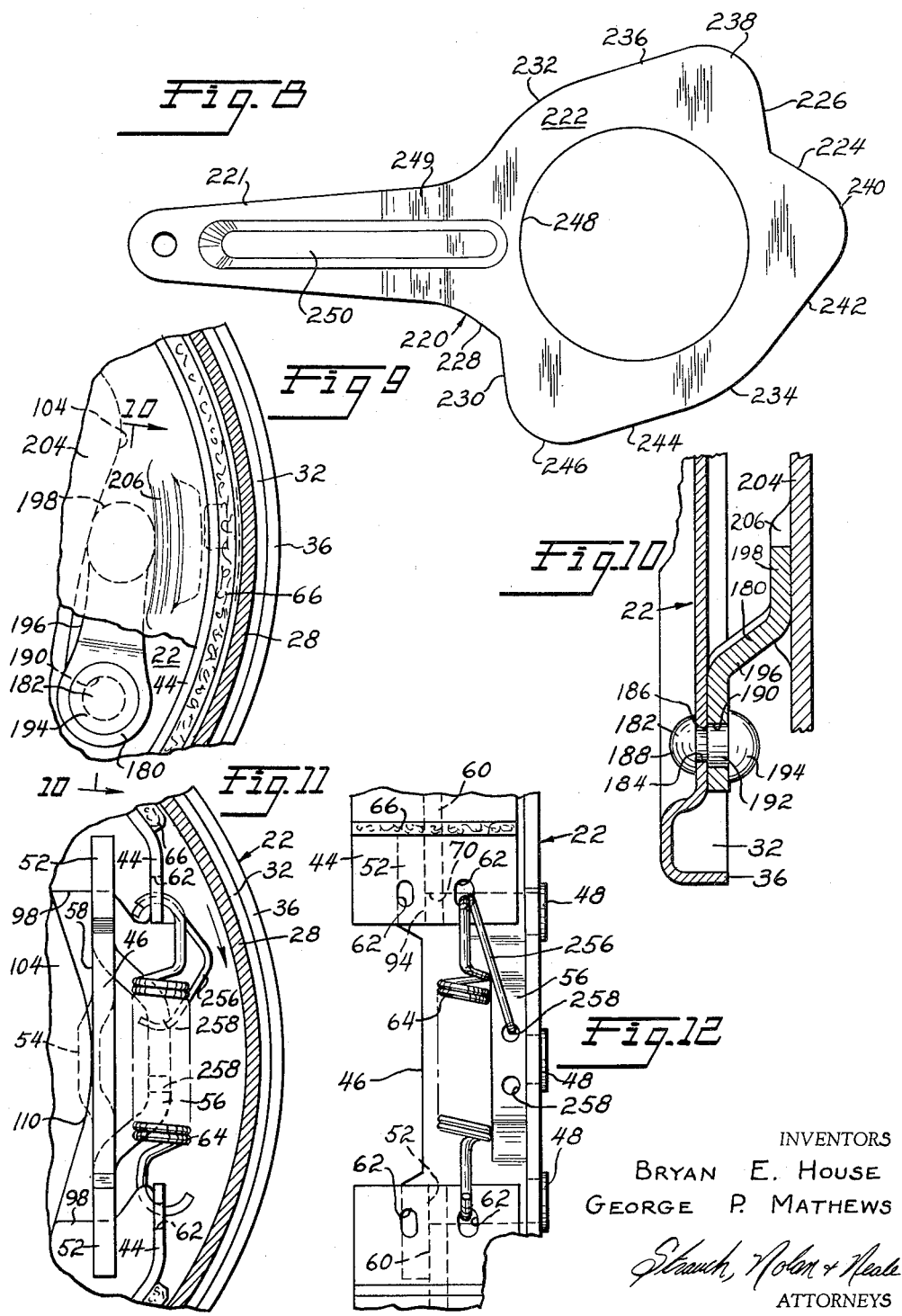

INVENTORS
BRYAN E. HOUSE,
GEORGE P. MATHEWS
ATTORNEYS

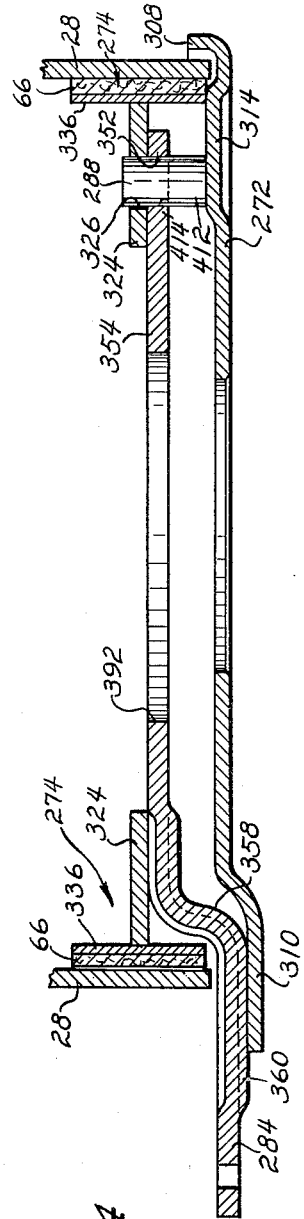
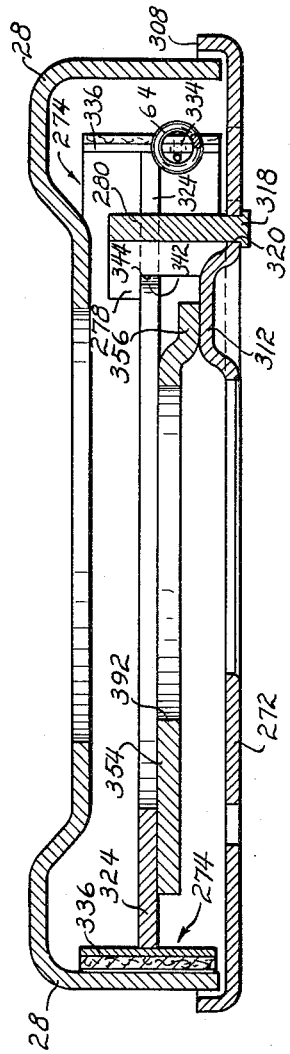
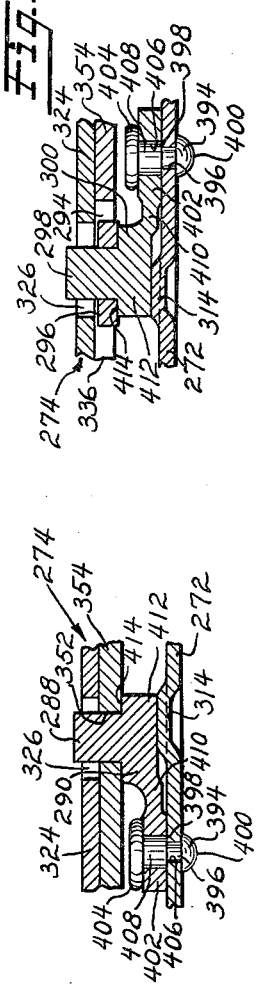

United States Patent Office 3,053,347
Patented Sept. 11, 1962

3,053,347
BRAKE SHOE FOR EXPANDING SHOE BRAKE
Bryan E. House, Birmingham, Mich., and George P. Mathews, Ashtabula, Ohio, assignors to Rockwell-Standard Corporation, Coraopolis, Pa., a corporation of Pennsylvania
Original application Sept. 2, 1954, Ser. No. 453,824, now Patent No. 2,852,105, dated Sept. 16, 1958. Divided and this application Feb. 3, 1958, Ser. No. 712,703
2 Claims. (Cl. 188—78)

This invention relates to improvements in brake shoe assemblies and has particular reference to the type of brake in which a pair of floating shoes are provided with a floating actuating lever for obtaining balanced shoe actuation. This application is a division of co-pending application Serial No. 453,824, filed September 2, 1954, now U.S. Letters Patent No. 2,852,105 issued September 16, 1958.

This novel improved type brake construction provides a two shoe internally expanding brake in which the shoes are equally effective to provide balanced braking action for forward or reverse brake drum rotation. It provides a brake construction which is free of internal adjusting means.

It is known to use floating shoes actuated into engagement by pivoted levers coacting with the shoes at their midpoints, the levers being actuated by rotatable or shiftable cams mounted on the backplate adjacent one end of the levers and adjustable by means mounted on the backplate adjacent the other end of the levers. Such prior art brake shoe actuating and adjusting means have various disadvantages and some of the objects of the present invention are to overcome these disadvantages.

Among the disadvantages of prior art mechanisms are the need of a plurality of machined interacting elements that have to be accurately located on the backplate and require adjusting mechanisms to assure balanced application of pressure to each shoe. Even in brake mechanisms with so-called floating shoes there is normally a circumferentially constraining pivotal engagement between the actuating levers that move the shoes in a radial direction and the centerline of the shoes. Because the levers are pivoted at their adjacent ends, the arc through which each shoe is moved into engagement with the drum has a different path to the rotating drum. Although seemingly a minor factor, this difference results in loss of braking efficiency and creates unequal wear on the shoes and will result in unequal braking action in forward and reverse rotation of the brake drum.

As related to brake balance or unbalance, a steel drum will suffer deformation in the back wall around its mounting surface when employed with an unbalanced brake. This is, of course, due to the unbalance of shoe radial forces which tries to push the drum off the shaft centerline and the result is a deformation in the back face which cocks a drum out of square with the brake. Further, a radial load is imposed on the shaft bearings and, particularly, the oil seal which causes oil leakage onto the brake. There is no way to eliminate this deformation from unbalanced braking, and the drum back must be heavy to prevent permanent set.

The use of a balanced brake in a steel drum permits the use of a lighter gauge steel (which can be stamped) and eliminates the oil leakage problem.

The primary object of this invention is, therefore, to provide a novel improved brake shoe for internally expanding brake mechanisms.

A further object resides in the provision of novel mechanisms for obtaining balanced shoe actuating force for any condition of shoe lining wear.

A still further object resides in novel improved brake shoe abutment members which axially support and guide the lever actuating means in floating motion normal to the brake drum axis.

Another object is to provide a brake construction free from internal adjusting means.

Another object resides in the provision of novel integral shoe web extensions which interact with abutment members to center the shoes upon brake deactuation and which are shaped to permit shoes to be full floating upon actuation.

Another object resides in the provision of a central abutment section on each shoe web to permit a pawl pin (or roller) to transmit actuating force on the shoe centerline.

Further objects and advantages of the invention will become apparent as the description proceeds, in connection with the appended claims and the annexed drawings wherein:

FIGURE 1 is an end view of a brake mechanism with the new improved brake shoes;

FIGURE 2 is a cutaway and sectioned view taken along line 2—2—2 of FIGURE 1 and illustrating further details of the brake;

FIGURE 3 is a cutaway and sectioned view taken along line 3—3 of FIGURE 1 and illustrating further brake details;

FIGURE 4 is a partial sectioned view taken along line 4—4 of FIGURE 1 illustrating a pawl and the pawl mounting detail;

FIGURES 5, 6 and 7 illustrate details of an abutment member;

FIGURE 8 is a view of a modified two directional actuating lever with four actuating ramps or camming surfaces;

FIGURE 9 is a view of another pawl embodiment;

FIGURE 10 is a partial sectioned view of the brake embodiment using the pawl of FIGURE 9;

FIGURES 11 and 12 illustrate a spring clip means for the elimination of shoe abutment slap during primary drum rotation;

FIGURE 13 is an end view of a modified embodiment of my new improved brake;

FIGURE 14 is a cutaway and sectioned view taken along line 14—14—14 of FIGURE 13 and illustrating further brake detail of the modified embodiment;

FIGURE 15 is a cutaway and sectiond view taken along line 15—15—15 of FIGURE 13 illustrating further brake detail;

Figures 18, 19:
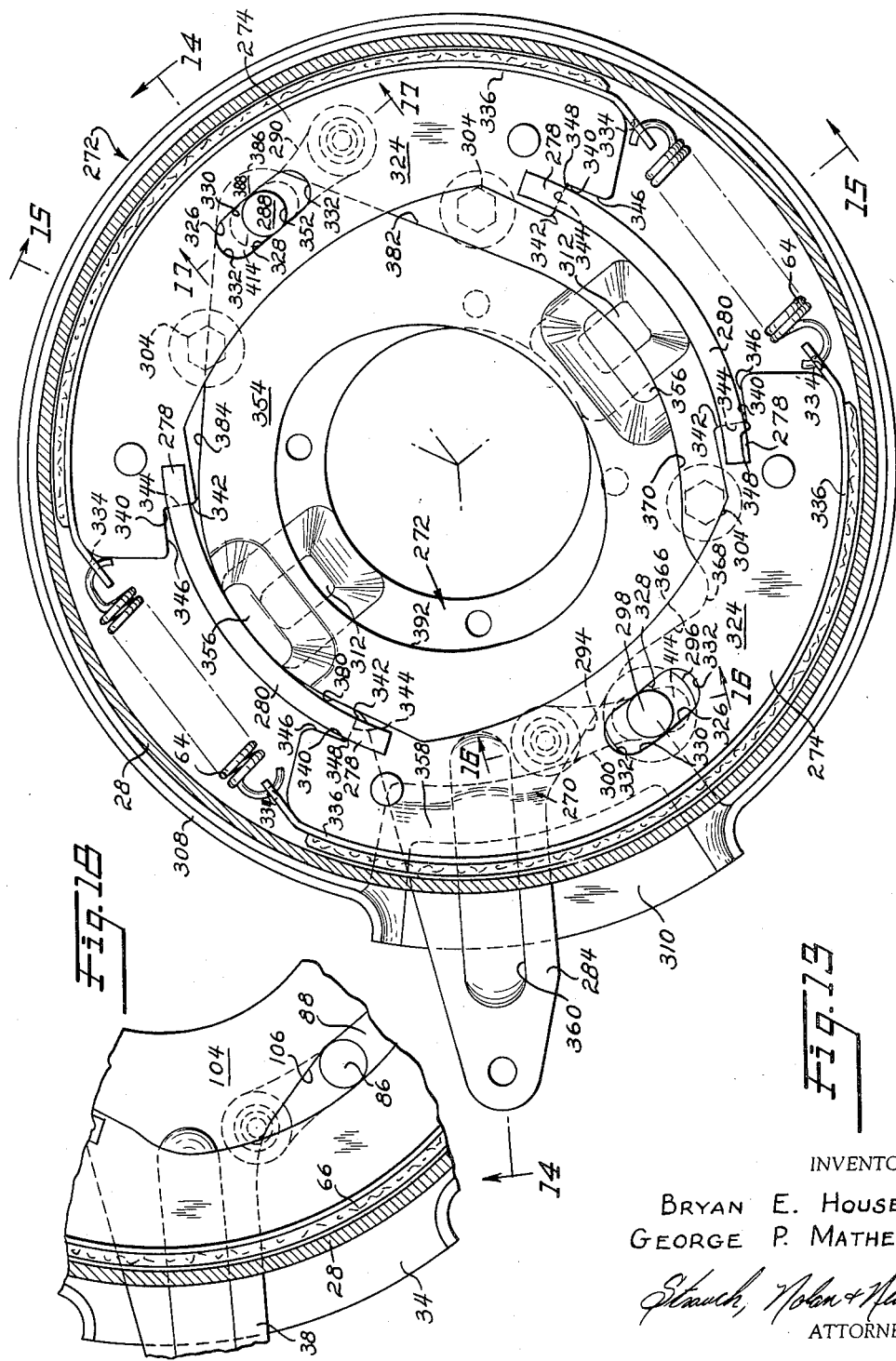

FIGURES 16 and 17 are partial sectioned views taken along lines 16—16 and 17—17 of FIGURE 13 illustrating details of the structural relationship between the two pawls and the brake assembly; and FIGURE 18 is a detail end view illustrating how the web aperture may be eliminated.

In the accompanying drawings, in which like reference numerals are used to designate similar elements throughout, several embodiments are illustrated for the purpose of disclosing the invention. The drawings are for the purpose of illustration only, as it will be apparent to those skilled in the art that various changes in the disclosed mechanisms may be made without in any way exceeding the scope of this invention.

With reference to the drawings, particularly FIGURES 1, 2, and 3, a new improved brake 20 includes a backing plate 22, shoes 24, a lever actuator 26 and a drum 28. The brake drum 28 is a fabricated steel stamping bolted to a rotating shaft or axle flange (not shown). Use of a stamped steel brake drum is made possible because of the novel actuation and balanced braking of shoes 24. The backing plate 22 is mounted on a fixed member (not shown) by bolts through openings 30 and is provided with an annular channel 32 into which drum 28 projects. A portion 34 of the outer lip 36 of channel 32 is laid back to provide for an outwardly extending arm 38 of lever actuator 26 and to permit the actuating stroke movement of the lever. The backing plate is also provided with two integral support pads 40 against which the respective shoe tables 44 rest.

Two identical shoe abutment members 46, formed by stamping, are rigidly mounted in diametrically opposed relationship on the inside face of backing plate 22. Each member 46 is mounted on backing plate 22 by three riveting projections 48 which extend though backing plate slots 50. The abutment members, FIGURES 5, 6 and 7, have two integral lugs 52, projecting laterally and spaced from the backing plate, and integral intermediate deformations 54 and 56. Lugs 52 cooperate with one side of the ends of the brake shoe webs 60 to axially restrain the brake shoes against movement away from the backing plate. The deformation 56 in each abutment projects outward from a plane surface 58 of the abutment member and a guide lug 54 projects inward to axially restrain the actuator 26 from movement toward the backing plate. As shown in FIGURE 2, the actuator 26 and brake shoe webs 60 are maintained in a definite axial position between the lateral lugs 52 and the intermediate lugs 54.

Brake shoes 24 are identical and interchangeable. The shoe tables 44 have spring fastening openings 62 for anchoring return springs 64. Two openings 62 are provided at each end of brake shoe tables 44 beyond the respective ends of brake linings 66, one opening on each side of the plane of the brake shoe web 60. Springs 64 fasten to adjacent shoe ends radially outward of the abutment members 46 in the openings 62 that are positioned between the plane of shoe webs 60 and backing plate 22, and exert a deactuating force on the shoes to bias them against the side edges 70 of the abutment members 46 and by reason of the biasing force being offset on the backing plate side of shoe web abutment with edges 70 will hold the shoes against the backing plate.

An elongated aperture 76 in the central portion of the web 60 of each shoe 24 is provided with spaced curved edges 78 and 80 formed by circular arcs having their centers the same as the center of the brake shoe table, and rounded ends 82, and operatively receives an actuating pawl boss 86. Upon radial displacement of the shoes against the drum 28 the apertures 76 permit a rotational displacement of shoes 24 in the direction of drum rotation, which is limited by the leading edge of the shoes engaging abutment members 46, without a change in brake actuating stroke. Should a slight degree of self-actuation be desired the centers of the curved edges 78 and 80 can be offset toward the brake shoe table.

The edge 80 of opening 76 in each web 60 is operatively engaged by the head or boss 86 of a lever 88. The location of springs 64, offset from the plane of the shoe web toward the backing plate, creates a force bias on shoes 24 about abutment member edges 70 and/or the contact points 90 between the edge 80 of the web opening 76 and the actuating pawl boss 86. This offset biasing force holds each shoe table 44 against the respective backing plate pad 40 with sufficient force to minimize vibration and rattle during the brake actuated and deactuated positions.

Each end of the shoe webs 60 is formed with an inclined tongue extension 94 so located that the intersections of the inner inclined edge 96 of the tongue with the respective shoe web abutment edges 98 are closely adjacent the outer corner of abutment member edges 70 when return springs 64 hold the shoes 24 against the abutment members 46 in deactuated position. The inclined tongue edges 96 are divergent one to the other in order that shoes 24 will be full floating upon actuation and so that the intersection of edges 96 with the outer corners of abutment edges 70 will center the shoes 24 as they are returned to the deactuated state by springs 64, upon deactuation of the brake.

Lever actuator 26 is supported and guided by abutment members 46 to float in a plane normal to the brake drum axis and parallel to abutment faces 58. The actuator 26 is equipped with an integral lever 38 and an actuating ramped body 104. The body 104 is formed on opposite edges with actuating camming surfaces or ramps 106 and 108 which engage and move the bosses 86 and shoes 24 substantially diametrically away from each other, as lever actuator 26 is rotated in a counterclockwise direction (as viewed in FIGURE 1) to thus actuate the brake. Edges 110 and 112 on opposite sides of the actuator body 104 are arcs of the same circle and provide a substantially constant clearance between the body 104 and the faces 58 of abutment members 46 enabling the abutment member to give continued axial support, for any operational rotative and transverse position of the actuator body 104.

The curved edge 114 of actuator body 104, which is tangent to ramp 106, extends to a rounded corner 116. A straight edge 118 extends from corner 116 to and is tangent with the circular arc 110, which arc is also tangent with a straight edge portion 120. The edge 120 is in turn tangent with a curved edge 122, being in turn tangent with ramp 108. The curved edge 124, which is tangent to ramp 108, extends to a rounded corner 126 and a straight edge 128 extends from corner 126 to and is tangent with circle segment 112. A central opening 134 in body 104 provides sufficient clearance for transverse shifting of body 104 normal to a wheel hub (not shown) and an opening 136 in the backing plate 22 provides for attachment to an axle housing (not shown). Lever arm 38 is provided with a lateral step 140 to clear the brake drum 28, a shoe 24 and pass through channel 32 in the backing plate. A longitudinal corrugation or added stiffener 142 in the lever step gives lever 38 greater rigidity.

Referring to FIGURES 1, 2 and 4, actuating levers 88 are mounted on backing plate 22 by stepped rivets 150 which permit free relative rotational movement about the rivet anchor point. Rivet 150 fits tight in the backing plate opening 152 and tightly embraces the backing plate 22 between the rivet shoulder 154 and rivet head 156. The pivoted end 160 of the lever 88 has an opening 162 encompassing the rivet shank 164 with a free turning fit between the rivet head 166 and backing plate 22. Each lever 88 is formed with an arm 170 extending from pivoted end 160 to a cylindrical shaped actuating boss 86. An extension 172 is disposed below boss 86 on the opposite side of arm 170 to slidably engage backing plate 22. This engagement between the lever and the backing plate provides support under the boss 86 and assures and maintains proper alignment between the boss and the shoe opening 76. This intermediate linkage (lever 88 coacting between the floating lever actuator 26 and the arcuate openings 76 in the respective brake shoes 24) eliminates the frictional force which results when an actuating lever engages and acts directly on the brake shoes and which in turn causes unbalanced brake shoe application.

In operation the arrangement which enables free transverse floating of lever actuator 26 between the two opposed pawl bosses assures that the force transmitted by the cammed ramp edges 106 and 108 through bosses 86 to shoes 24 when the actuator body 104 is rotated for brake actuation will be equalized because of action and reaction on the floating actuator. The actuating body ramps 106 and 108 provide sufficient actuating stroke for any condition of shoe lining wear and eliminate the need for internal brake adjustments. Note that the bosses are moved substantially diametrically outward of each other during brake actuation and will transmit the braking force to each shoe at substantially the same relative position on each shoe regardless of the direction of drum rotation.

Another embodiment for our new improved brakes is shown in FIGURES 9 and 10. In this arrangement, as in the previous embodiment, levers 180 are mounted on the backing plate 22 by stepped rivets 182 which permits the levers free relative pivotal movement about the rivet anchor point. Rivet 182 is fit tight in backing plate opening 184 and tightly embraces the backing plate 22 between rivet shoulder 186 and rivet head 188. Opening 190 encompasses the rivet shank 192 with a free fit between rivet head 194 and backing plate 22. Each lever 180 is formed with an upwardly inclined center portion 196 which holds the top surface of an oval actuating head 198 against the side surface of a shoe web 204, and radially located between actuator body 104 and a curved shoe web projection 206. The curve of this projection is preferably a circular arc having a center the same as the brake shoe table. Rotation of the actuator body transmits a radial force through the oval heads 198 to web projections 206 to actuate the brake shoes. The heads 198 merely abut the web projections to cause radially outward movement of the shoes and do not restrict circumferential float of the shoes which can move circumferentially with the rotation of the brake drum, unimpeded by the bosses, until the ends of the shoes abut against the abutment members.

A modified lever actuator 220, FIGURE 8, may be used in place of the lever actuator 26 in the brake of FIGURE 1 to obtain two directional brake actuations, i.e., brake actuation is obtained regardless of the direction of movement of the lever from a neutral position. Lever actuator 220 is equipped with integral lever arm 221 and actuating body 222. As distinguished from lever actuator 26 which actuates the brake only when moved in one direction and has only one set of ramps, the lever actuator 220 has a body 222 provided with two sets of camming surfaces or ramps, one set 224 and 226 which intersect and form a V, and a second set 228 and 230 which intersect and form another V on the opposite edge. Edges 232 and 234 on opposite sides of actuator body 22 are formed as arcs of the same circle. The straight edge 236 is tangent to both the circular arc 232 and to curved edge 238 which is also tangent to ramp 226. The curved edge 240 is tangent to both ramp 224 and to straight edge 242 which is also tangent to circular arc 234. A straight edge 244 is tangent to both circular arc 234 and to curved edge 246 which is also tangent to ramp 230. The opening 248 provides clearance for a wheel hub (not shown) in a manner similar to that of opening 134 in actuator 26. Lever arm 221 is formed with step 249 to clear drum 28, shoe 24 and to pass through channel 32. A longitudinal corrugation or stiffener 250 provides lever 221 with greater rigidity. One boss 86 will project into the valley of the V formed by ramp edges 224 and 226 and the other boss into the valley of the V formed by the ramp edges 228 and 230.

In operation, counterclockwise rotation of floating lever actuator 220 will, throuugh engagement of ramp edges 224 and 228 on the respective bosses 86, transmit equalized actuating forces through the bosses to shoes 24. Ramp edges 226 and 230 will coact with the respective bosses 86 in a like manner, upon clockwise rotation of lever actuator 220. Thus identical braking actuation is obtained for both directions of lever movement. When the brake is in the deactuated state the spring biased brake shoes will force each pawl boss 86 to rest against the actuator in the valley of the respective V.

FIGURES 11 and 12 show an auxiliary spring clip 256 consisting of a bent spring wire having hooked ends, one end being fastened in a shoe table opening 62 through which an end of shoe return spring 64 is also fastened and the other end being fastened in an opening 258 in shoe abutment member 46. The spring clip 256 is utilized in installations where the brake drum rotation is primarily in one direction as indicated in FIGURE 11. One spring clip 256 is used at the diametrically opposite leading end of each shoe 24 relative to the primary direction of rotation of drum 28. The clips serve to keep the leading end of each shoe in abutting engagement with the abutment 46 when the brake is actuated and will thus prevent abutment slap which occurs if the shoes are lifted off both abutments and subsequent engagement with the drum carries the shoes into engagement with the abutments. The spring action of clip 256 permits the shoe, upon brake actuation, to slide radially outward on the abutment 46 and thus maintain balanced brake shoe application against the drum.

A modified novel brake embodiment is shown in FIGURES 13 through 17. In this arrangement the lever actuator 270 is axially restrained on one side by engagement with backing plate 272 and on the other side by engagement with shoes 274 which in turn engage lugs 278 on abutment members 280. The lever actuator is provided at one end with an arm 284 and is journalled at the opposite end on boss 288 of lever 290. One edge of the actuator is equipped with a ramp 294 which contacts a roller 296 journalled on boss 298 of the other lever 300.

Backing plate 272, which is mounted by bolts 304 to a stationary frame (not shown) is provided with an outer peripheral lip 308 within which a brake drum 28 projects. A circumferential portion 310 of lip 308 is laid back to provide a backing support and guide for the outwardly extending lever arm 284 of the lever actuator 270 throughout the lever actuating stroke. The backing plate 272 is formed, by stamping, with raised sections providing two actuator support and guide pads 312 and two boss support pads 314. The two support pads 312 coact with the actuator in a manner to be described, to provide axial backing plate support, while pads 314 provide a backing for bosses 288, 298 and additional axial support for the actuator 270 and brake shoes 274 which rest against the levers as seen in FIGURES 16 and 17. The pads 312 and 314 may alternatively be fabricated by welding flat blocks on the backing plate, however, the preferred and most economical pads are formed by stamped indentations in the back face of the backing plate as illustrated.

Stamped curved shoe abutment members 280 are formed with lugs 278 at each end for axially restraining the brake shoes 274. Projections 318 on the abutment members 280 extend through slots 320 in the backing plate, and are riveted or staked over to rigidly mount the abutment members on the backing plate 272.

Interchangeable brake shoes 274 have webs 324, each provided with an elongated aperture 326 with spaced curved edges 328 and 330 and rounded ends 332 to operatively receive a boss and permit circumferential displacement of shoes 274 by the brake drum 22 in the direction of drum rotation for abutment with abutment members 280 when the brake is actuated. Return spring fastening openings 334 are located in the brake shoe table 336 and provide means for fastening the return springs to give the same results in this embodiment as described for openings 62 and return springs 64 in the embodiment of FIGURE 1.

Both ends of shoe webs 324 are notched at 340 to provide a set back abutment edge 342 for abutment with the respective abutment edge 344 of abutment members 280. The sloped side edge 346 of each notch 340 inclines outwardly in order that the shoes 274 will be full floating upon actuation and the interaction of the sloped edges 346 with the outer corners 348 of abutment edges 344 centers the shoes 274 as they are returned by the springs to the deactuated state.

The end of lever actuator 270 which pivotally engages lever 290 is provided with an opening 352 journalled, with a free turning fit, on boss 288. The pivotal mounting of lever 290 to the backing plate 272 permits floating motion of the lever actuator 270 normal to the brake drum axis, across the brake for balanced shoe actuation. Lever actuator 270 includes the outwardly extended arm 284 and actuating body 354 and is provided with boss pads 356, formed by stamping, which rest against and slide over the previously mentioned backing plate pads 312 during any movement of the actuator. The lever arm 284 is formed with a step 358 and stiffening rib or corrugation 360, similar to that described for the embodiment of FIGURE 1. The ramp edge 294 extends from the lever arm 284 to a straight edge 366, which in turn extends to a rounded corner 368 thus increasing the actuator body width to provide a greater alignment stability between the actuator body and the shoes during brake actuation. A rounded edge 370 extends from the rounded corner 368 and a second rounded edge 380 on the opposite side of the actuator body extends from lever arm 284 to merge into respective straight edges 382 and 384 which converge to a rounded end 386 and form an extension 388 containing the opening 352. Sufficient clearance is provided between the rounded edges 370 and 380 and the respective abutment members 280 to enable a full actuating stroke of the actuator 270 throughout the life of the shoe lining. An elliptical opening 392 in the center of actuator 270 provides sufficient clearance, from an axle shaft or spindle (not shown), and also enables a full actuating stroke throughout shoe lining life without interference between the actuator and the axle or spindle.

Actuating levers 290 and 300 are mounted on backing plate 272 by stepped rivets 394 which permit free relative rotational movement about the respective rivet anchor point. Each rivet 394 is fitted tightly in an opening 396 in the backing plate and tightly embraces the backing plate between shoulder 398 and rivet head 400. The pivot 402 has a free turning fit between the rivet head 404 and backing plate 272 and is provided with opening 406 having a free turning fit on rivet shank 408. Each lever is formed with an arm 410 extending from the pivot end 402 to an elongated base 412 integrally carrying the boss. The elongated base 412 rests on and is slidably supported by one of the previously mentioned backing plate support pads 314 throughout the pivotal movement of the lever and is formed with a shoulder 414. The surface of the elongated base from which the cylindrical shaped bosses 288 and 298 extend provides a shoulder 414 on lever 290 (FIGURE 17) that axially supports the lever actuator 270 and the respective brake shoe 274, and a shoulder 414 on the lever 300 (FIGURE 16) that axially supports the roller 296 and respective brake shoe 274. Note, the rivet opening 396 in backing plate 272, for pivotally mounting the lever 300, is located radially closer to the brake center than opening 396 for pivotally mounting the lever 290. This difference in pivot location is necessitated by structural arrangement of parts to enable the step 358 of lever 284 to clear the lever 300 during all operative positions of lever actuator 270. The construction using a roller engaging the lever, as shown, may be used, or alternatively a roller may be used between the bosses and the shoe web or two rollers may be used on the bosses for engagement with both lever actuator and shoes if desired, for both of the levers in the embodiment of FIGURE 1, and for the one lever 300 in the embodiment of FIGURE 13.

In operation, as the lever actuator 270 is rotated in a counterclockwise direction about boss 288 of lever 290 for brake actuation, roller 296 and boss 298 of lever 300, together with the respective brake shoe, are moved to the right by the actuating ramp 294. The wedging force of the ramp, which carries one shoe 274 to engagement with drum 28, has an equal and opposite reactive force which is floatingly transmitted through the actuator body 354 to the lever 290 and the respective shoe 274 to give equalized and balanced brake shoe actuation. The elongated apertures in the brake shoe webs enable circumferential float of the shoes as in the previously described embodiment.

The structural cooperation between the boss and the shoe webs does not require the apertures in the webs as illustrated in the two brake assemblies or the offset web projections 206 illustrated in FIGURES 9 and 10. The bosses may directly engage curved edges of the shoe webs as illustrated in FIGURE 18. As in the webs with curved apertures and with offset projection the curve of the edge of the web in this arrangement is preferably a circular arc having the same center as the brake shoe table.

In each of the primary disclosed embodiments, the only force required of the actuator is that force which is directed radially against the brake shoes to force the shoes into engagement with the brake drum. This is enabled by providing a circumferentially floating engagement between a shoe and its actuating member and further providing a stationary abutment member capable of withstanding the circumferential drag force transmitted to the shoes by frictional braking engagement between the shoes and the drum. Thus the force resisting the brake drag is absorbed by a member separate from the brake shoe actuator. This leaves only the radially directed actuating forces to be absorbed by the actuator. By providing a single actuator engaging both shoes through the aforesaid floating engagement at the approximate center of the brake shoes and by supporting the actuator to enable it to have free movement between the shoes, the radial braking forces on the shoes will equalize through the actuator. This equalization of radial forces on the shoes must occur because the brake structure does not utilize positive radial force absorbing connections to fixed structure between the two shoes.

Balanced braking action between the two shoes is obtained by such force equalization and, because of the symmetry of the brake shoe and abutment assembly about the center line through the brake shoes, this balanced action is attained regardless of direction of drum rotation.

The novel arrangement of the shoe actuator to be rotatably moved about a floating axis proximate to the brake drum axis in some embodiments and about a boss in other embodiments enables a relatively long lever action between the actuator ramp or cam surface and the axis of actuator rotation, as compared with expanding shoe brakes having the actuator cam and axis between the ends of brake shoes. The use of a long lever arm to the ramp or cam surface enables the use of a relatively steep camming surface. The simplicity of construction with the ramp or cam surface situated at the approximate center of the brake shoes also enables the use of a relatively long extent of the camming surface. These three factors combine to provide an excellent means of actuation that is operative to apply a full braking force throughout the life of the brake lining and consequently there is no need for any brake shoe adjustment as is so often true in brakes where the construction limits the leverage and camming action obtainable from the actuator.

From the foregoing description it is apparent that we have provided new, improved, mechanically balanced, two shoe internally expanding brake embodiments, each with an actuating member which floats in a path approximating the center line of the brake shoes. The invention provides new improved brakes that can utilize stamped steel brake drums and in which both shoes are equally effective for both forward and reverse drum rotation throughout the brake lining life. It provides brakes in which no internal adjustments are needed because the actuating lever ramps insure sufficient shoe motion for balanced braking action throughout the lining life. It provides pivotally anchored levers with actuating bosses interposed between the lever actuator body and the shoes to prevent unbalanced brake torque delivery. It provides a brake shoe return spring construction which biases brake shoes axially against backing plate pads to reduce rattle and dampen vibration. It provides brakes with full floating shoes upon actuation which are centered by the abutment members upon deactuation. It provides spring means which eliminate shoe abutment slap in brakes with one primary direction drum rotation.

This invention provides a brake with shoes and springs that are completely interchangeable, with few moving parts that do not require lubrication. The balanced torque application between the two shoes results in uniform wear, longer life and smoother consistent braking performance and enables the use of stamped steel drums which are lighter in weight and less costly than cast drums. Maintenance is reduced to a minimum as no internal adjustments are required and servicing and installation is simplified and foolproof eliminating the need for skilled help. All of the foregoing factors, fewer parts to wear and stock, longer life, and less maintenance combine to greatly reduce the overall cost of this brake.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A symmetrical floating brake shoe assembly comprising an arcuate table, a brake lining secured on the convex side of said arcuate table, a web projecting rigidly from the concave side of the table, said web having identical opposite ends and having a centrally disposed curved actuator force bearing edge portion, the arc of which is of minor length and circular and has a radial center the same as the radial center of the brake shoe table, oppositely facing abutment edge portions at opposite ends of said web each adapted to abut a brake mechanism abutment, an abutment positioning lug on each end of said web providing a brake shoe centering surface disposed radially outwardly of and extending away from the associated edge abutment portion in the direction of the adjacent end of said shoe assembly, said centering surfaces facing away from said table, and means providing similar spring anchor formations on the opposite ends of said brake shoe assembly.

2. A symmetrical reversible brake shoe assembly comprising an arcuate platform, a radial web rigidly projecting from the concave side of said platform, said web having substantially identical ends and being formed at its opposed inner corners with identical notches providing longitudinally oppositely facing abutment surfaces and inclined abutment engaging shoe centering surfaces extending from the abutment surfaces in the direction of the adjacent ends of the shoe assembly, a brake lining secured on the convex side of said platform, and a longitudinally extending slot in said web about midway between said ends, said slot being of minor length compared to the length of said web and the side of said slot adjacent the platform providing an actuator force bearing edge that lies in a circular arc having substantially the same center as said platform, and said centering surfaces facing away from said platform.

References Cited in the file of this patent

UNITED STATES PATENTS

| | | |
|---|---|---|
| 977,824 | Muelhauser | Dec. 6, 1910 |
| 1,132,541 | Baker | Mar. 16, 1915 |
| 1,967,398 | Dodge | July 24, 1934 |
| 2,291,012 | Watts | July 28, 1942 |
| 2,770,327 | White | Nov. 13, 1956 |

FOREIGN PATENTS

| | | |
|---|---|---|
| 462,819 | Canada | Jan. 31, 1950 |